United States Patent
Joshi et al.

(10) Patent No.: US 7,327,706 B2
(45) Date of Patent: *Feb. 5, 2008

(54) RESYNCHRONIZATION OF POINT-TO-POINT PROTOCOL SESSIONS FOR INTER-PDSN HANDOFFS

(75) Inventors: Abhay Arvind Joshi, San Diego, CA (US); Jeffrey Alan Dyck, San Diego, CA (US); Ramin Rezaiifar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 837 days.

This patent is subject to a terminal disclaimer.

(21) Appl. No.: 10/669,600

(22) Filed: Sep. 23, 2003

(65) Prior Publication Data

US 2005/0036504 A1 Feb. 17, 2005

Related U.S. Application Data

(60) Provisional application No. 60/469,930, filed on May 12, 2003, provisional application No. 60/470,387, filed on May 13, 2003.

(51) Int. Cl.
*H04Q 7/00* (2006.01)
*H04B 7/216* (2006.01)
*H04J 3/06* (2006.01)
*H04J 3/16* (2006.01)

(52) U.S. Cl. ............... 370/331; 370/335; 370/350; 370/465; 455/437

(58) Field of Classification Search ............. None
See application file for complete search history.

(56) References Cited

U.S. PATENT DOCUMENTS

| | | | |
|---|---|---|---|
| 6,377,556 B1 * | 4/2002 | Lioy et al. ............... | 370/310 |
| 6,424,639 B1 * | 7/2002 | Lioy et al. ............... | 370/338 |
| 6,822,952 B2 * | 11/2004 | Abrol et al. ............. | 370/338 |
| 2002/0181510 A1 * | 12/2002 | Abrol et al. ............. | 370/503 |
| 2006/0023668 A1 * | 2/2006 | Ramaswamy et al. ...... | 370/335 |

OTHER PUBLICATIONS

Inter-Operability Specification (IOS) for High Rate Packet Data (HRPD) Access Network Interfaces; A.S0007-0 Version 2.0 (TIA-878) 3rd, Nov. 2001.
Duplaix, J., Perras M., Segura L.: "Defensive Publication", Feb. 29, 2000, Ericsson Communications Canada, Ericsson.
Simpson W: "The Point-to-Point Protocol (PPP)", RFC, Jul. 1994, Section 1, Section 4.4 and Section 6.4.

* cited by examiner

*Primary Examiner*—Huy D. Vu
*Assistant Examiner*—Nittaya Juntima
(74) *Attorney, Agent, or Firm*—Thomas R. Rouse; Kyong H. Macek; Kristine U. Ekwueme

(57) ABSTRACT

Methods and apparatus are presented to support the mobile Internet Protocol (mobile IP) across different air interface standards. In particular, mechanisms are provided that will allow a mobile device to selectively force a Point-to-Point Protocol (PPP) session resynchronization when the mobile device moves from the support of one air interface standard to another.

16 Claims, 2 Drawing Sheets

FIG. 1 SIMPLE 1x + 1xEVDO NETWORK

RESYNCHRONIZATION OF POINT-TO-POINT PROTOCOL SESSIONS FOR INTER-PDSN HANDOFFS

RELATED APPLICATIONS

This application claims priority to U.S. Provisional Application No. 60/469,930, filed on May 12, 2003, and U.S. Provisional Application No. 60/470,387 filed on May 13, 2003.

BACKGROUND

1. Field

The present invention relates generally to communications, and more specifically, to the transmission of packetized data over wireless communication systems.

2. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Patent Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and IS-856 (cdma2000 1xEV-DO). The cdma2000 1xEV-DO standard is based on a data communication system disclosed in co-pending application Ser. No. 08/963,386, entitled "METHOD AND APPARATUS FOR HIGH RATE PACKET DATA TRANSMISSION," filed on Nov. 3, 1997, issued as U.S. Patent No. 6,574,211 on Jun. 3, 2003, which is assigned to the assignee of the present invention and incorporated by reference herein. The cdma2000 1xEV-DO communication system defines a set of data rates, ranging from 38.4 kbps to 2.4 Mbps, at which an access point (AP) may send data to a subscriber station (access terminal, AT). Because the AP is analogous to a base station, the terminology with respect to cells and sectors is the same as with respect to voice systems. Yet another CDMA standard is the W-CDMA standard, as embodied in 3rd Generation Partnership Project "3GPP", Document Nos. 3G TS 25.211, 3G TS 25.212, 3G TS 25.213, and 3G TS 25.214.

Given the growing demand for wireless data applications, the need for very efficient wireless data communication systems has become increasingly significant. One such wireless data application is the transmission of data packets that originate or terminate at packet-switching networks. Various protocols exist for transmitting packetized traffic over packet-switching networks so that information arrives at its intended destination. One such protocol is "The Internet Protocol," Request for Comment (RFC) 791 (September, 1981). The internet protocol (IP) breaks up messages into packets, routes the packets from a sender to a destination, and reassembles the packets into the original messages at the destination. The IP protocol requires that each data packet begins with an IP header containing source and destination address fields that uniquely identifies host and destination computers. Another protocol is the Point-to-Point Protocol (PPP), promulgated in RFC 1661 (July 1994), which is an encapsulation protocol for transporting IP traffic over point-to-point links. Yet another protocol is the IP Mobility Support, promulgated in RFC 2002 (October 1996), which is a protocol that provides for transparent routing of IP datagrams to mobile nodes.

Hence, the transmission of data packets from the IP network over a wireless communication network or from the wireless communication network over the IP network can be accomplished by adherence to a set of protocols, referred to as a protocol stack. A wireless communication device may be the origination or the destination of the IP packet, or alternatively, the wireless communication device may be a transparent link to an electronic device. In either case, payload information is broken into packets wherein header information is added to each packet. The IP header sits on top of the PPP layer, which sits on the RLP layer, which sits on top of the physical layer. The RLP layer is the Radio Link Protocol layer, which is responsible for retransmitting packets when a transmission error occurs. The packets are transported over the air to a packet data service node (PDSN) via an Access Point (AP), whereupon the packet is subsequently sent over the IP network. Alternatively, IP packets are transmitted over the IP network to a PDSN, from a PDSN to an AP, and then over-the-air to a wireless communication device. The wireless communication device is also referred to as an Access Terminal (AT) herein.

Various problems arise due to the mobility of wireless communication devices. Some of these problems arise when a mobile wireless communication device moves from the support of one communication system to the support of another communication system. For example, it is currently envisioned that a mobile wireless communication device may be designed to move from the support of a cdma2000 1xRTT system to a cdma2000 1xEV-DO system or vice versa. The interoperability of a device that may support both air interface standards is currently the subject of a proposed standard known as TIA/EIA/IS-878, which is entitled, "Inter-Operability Specification (IOS) for High Rate Packet Data (HRPD) Network Access Interfaces." However, this vision of ubiquitous mobility within CDMA standards is relatively recent. When the IS-2000 and IS-856 standards were originally created, it was not envisioned that such standards were compatible and certain features were deemed optional, rather than required. Hence, various manufacturers and system operators are currently in the predicament of being unable to support PPP sessions across different CDMA standards. In particular, there are no required mechanisms for resynchronizing a PPP session when a wireless communication device moves between the support of a PDSN in a cdma2000 1xRTT system and the support of a PDSN in a cdma2000 1xEV-DO system. There is a present need to address this concern.

SUMMARY

Methods and apparatus are presented to address the need stated above. In one aspect, an access terminal (AT) is configured to force a resynchronization of a PPP session whenever the AT determines that a new network does not support the Location Update Protocol.

In another aspect, a method is presented for using a RANHandoff indicator to determine whether an AT should force a resynchronization of the PPP session.

In another aspect, a method is presented for using a PPP Magic Number to determine whether an AT should force a resynchronization of the PPP session.

In another aspect, a method is presented for resynchronizing a PPP session that has been initiated between a first network and an AT and subsequently continued between a second network and the AT, the method comprising the following: determining whether an indicator of the second network is set to indicate the support of the Location Update Protocol; if the indicator indicates the support of the Location Update Protocol, then transmitting an unsolicited location notification message (ULNM) from the AT to the second network; and if the indicator indicates a lack of support for the Location Update Protocol, then transmitting a Link Control Protocol Configuration Request message (LCPConfigRequest) to the new network.

In another aspect, a method is presented for resynchronizing a Point-to-Point Protocol (PPP) session that has been initiated between a first network and an AT, the method comprising: determining whether the AT has entered the coverage area of a second network; transmitting a Link Control Protocol (LCP) packet to the second network from the AT; receiving a second LCP protocol packet from the second network at the AT; comparing a value in the second LCP protocol packet with a stored value; and if the value in the second LCP protocol packet is not the same as the stored value, then resynchronizing the PPP session.

In another aspect, apparatus in an AT is presented for determining whether to initiate resynchronization of a Point-to-Point Protocol (PPP) session that originated between a first network and the AT, the apparatus comprising: at least one memory element; and at least one processing element configured to execute a set of instructions stored within the at least one memory element, the set of instructions for: determining whether the AT has entered the coverage area of a second network; transmitting a Link Control Protocol (LCP) packet to the second network; receiving a second LCP protocol packet from the second network; comparing a magic number in the second LCP protocol packet with a stored magic number; and if the magic number in the second LCP protocol packet is not the same as the stored magic number, then initiating resynchronization of the PPP session.

DETAILED DESCRIPTION

Because the embodiments are directed towards mobile IP telephony, the terminology of RFC 2002 will also be used forthwith. The protocol promulgated in this document enables a mobile, wireless communication device to change the point of attachment to the Internet without having to change the IP address of the device. Namely, RFC 2002 describes a registration scheme that informs a home agent of the location of a wireless communication device so that the home agent can route data packets through foreign agents. A "home agent" is the infrastructure element that processes IP packets at the home system of the access terminal. A "foreign agent" is the infrastructure element that services the access terminal at a visited system. The access terminal is also referred to as a "mobile node". The functions of a foreign agent and/or home agent can be accomplished by a base station controller (BSC) in a visited network or a BSC in the home network. Authentication, authorization, and accounting functions are usually performed by a server, which is referred to as an Accounting, Authorization, and Accounting (AAA) Server. The AAA server is communicatively coupled to either a PDSN or a BSC.

Figure 1:
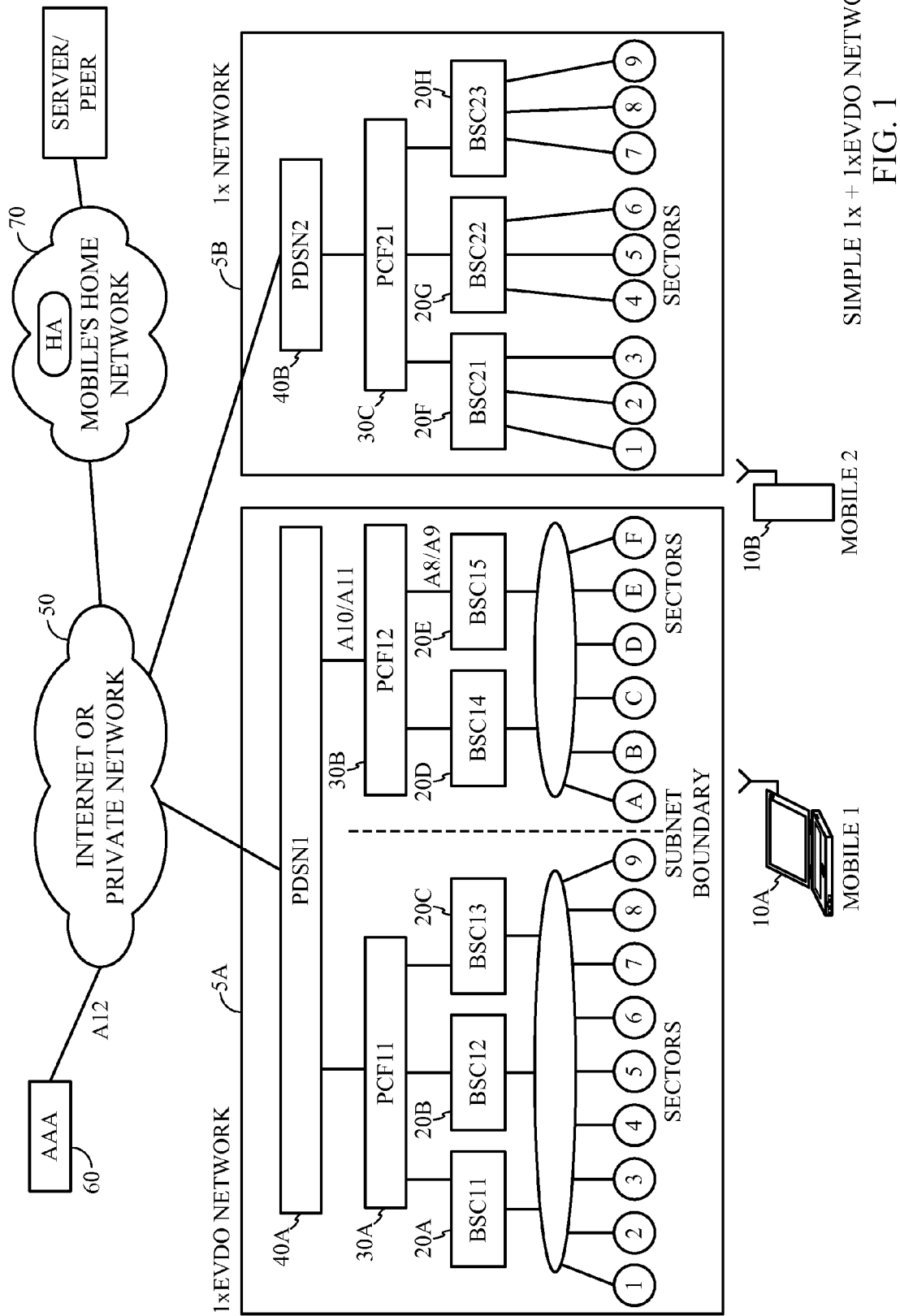
FIG. 1 is a block diagram of IS-2000 and IS-856 data networks.

FIG. 1 illustrates the connections between a plurality of wireless communication devices and various infrastructure elements of two cdma2000 systems. A plurality of access terminals $10a$-$b$ (also called remote stations, mobile stations, subscriber units, or user equipment) operate within sectors of a plurality of base station controllers $20a$-$c$, $20d$-$e$, $20f$-$h$ (also called radio network controller) of different networks $5a$, $5b$. The base station controllers $20a$-$c$, $20d$-$e$, $20f$-$h$ are supported by packet control functions (PCF) $30a$, $30b$, $30c$, respectively. Some packet control functions $30a$, $30b$ are supported by a PDSN $40a$ of one network $5a$ while the other packet control function $30c$ is supported by a PDSN $40b$ of the other network $5b$. It should be understood by one of skill in the art that there could be any number of access terminals 10, base station controllers 20, packet control functions 30 and PDSNs 40. The PDSNs 40 are coupled to an IP or private network 50, which is coupled to an AAA server 60 and/or a Home Agent 70 of the access terminals 10.

The access terminals 10 may be any of a number of different types of wireless communication device such as a portable phone, a cellular telephone that is connected to a laptop computer running IP-based Web-browser applications, a cellular telephone with associated hands-free car kits, a personal data assistant (PDA) running IP-based Web-browser applications, a wireless communication module incorporated into a portable computer, or a fixed location communication module such as might be found in a wireless local loop or meter reading system. In the most general embodiment, access terminals may be any type of communication unit.

In cdma2000 1xEV-DO, hereinafter referred to as EV-DO, the wireless communication system entities are conceptually simplified to an access terminal and an access network. An access terminal (AT) is any device that allows a user to access a packet switched data network through the EV-DO wireless access network. The access network (AN) comprises any network equipment/entity that provides data connectivity between a packet switched data network and access terminals.

A "handoff" occurs when a wireless communication device moves from the support of one base station to the support of another base station. Handoffs may be "soft," wherein the device is in communication with both base stations at the same time during the handoff process, or "hard," wherein the device ends communications with one base station before beginning communications with another base station. A handoff between one CDMA air interface system and another air interface system is referred to as a "dormant" handoff when a data session is connected, but not active. In other words, the AT and the PDSN maintain the PPP state but do not transfer data. When the AT is actively transferring data between itself and a PDSN, then the session is referred to as an "active data session."

According to IS-878, an AT that has already established a PPP session in one CDMA system, such as cdma2000 1xRTT, may transfer the PPP session over to a second CDMA system, such as cdma2000 1xEV-DO, if the second CDMA system supports the Location Update Protocol. The Location Update Protocol allows an AT to send an unsolicited location notification message (ULNM) to the new network whenever the AT determines that the AT has traveled to another air-interface network or that the AT has crossed a subnet boundary within an air-interface network. Upon receipt of the ULNM, the network determines whether the AT's determination is correct. If the determination is correct, then the network forces a resynchronization of the PPP session on behalf of the AT.

Unfortunately, the Location Update Protocol is not a required feature in the cdma2000 1xEV-DO standard. Hence, there are some infrastructure manufacturers who chose not to support the Location Update Protocol at the time the cdma2000 1xEV-DO standard was being formulated. Therefore, there is a present need for an alternate mechanism to force resynchronization of PPP sessions without effecting infrastructure equipment that have already been designed and manufactured. Note that resynchronization is required because the PPP sessions of one network may differ from the PPP sessions of another network. For example, the PPP framing may differ amidst and between different PPP sessions. "Framing" refers to the formation of transmission units at the Data Link Layer of the IP protocol. A frame may include a header and/or a trailer, along with some number of data units.

The embodiments that are presented herein are for supporting resynchronization of PPP sessions between networks that use different air-interface standards. The embodiments involve changes to the operational flow within wireless communication devices whenever such devices move from the range of one network to another during a PPP session. In general, the AT forces a resynchronization of the PPP session whenever the AT determines that a new network does not support the Location Update Protocol. In a first embodiment, the AT forces a resynchronization if the AT determines that the RANHandoff indicator is set to "0", which indicates that a new network does not support Location Update Protocol. In a second embodiment, the AT forces a resynchronization if the AT determines that the "PPP Magic Number" is not the same as a previous PPP Magic Number.

Figure 2:
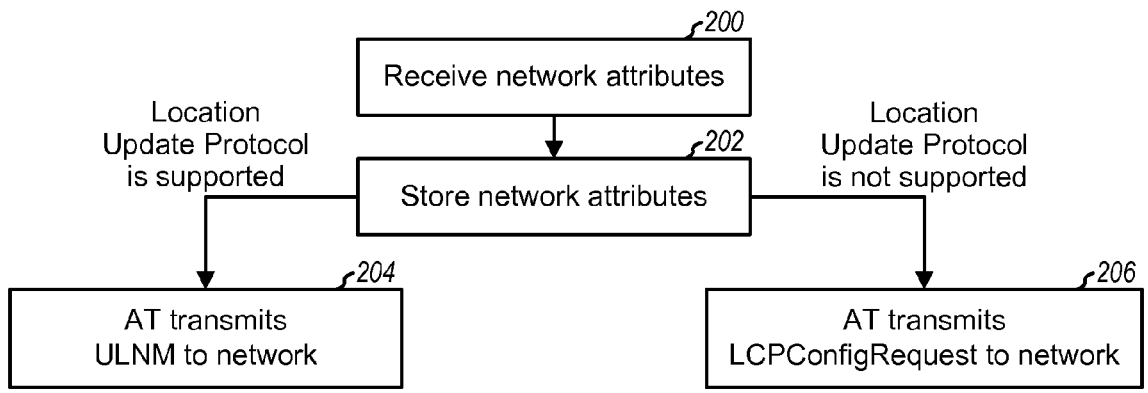
FIG. 2 is a flowchart illustrating one embodiment for forcing resynchronization of a PPP session.

In the first embodiment, the AT uses a RANHandoff indicator to determine whether to force a resynchronization of the PPP session. FIG. 2 is a flowchart illustrating the method steps of the first embodiment. The method may be implemented in hardware using at least one processing element which executes instructions for the method, wherein said instructions are stored on at least one memory element.

At step 200, the AT enters the coverage of a new air-interface network and receives attributes of the new air-interface network. In one aspect of the embodiment, the new air-interface network is a cdma2000 1xEV-DO. At step 202, the AT stores a RANHandoff attribute/indicator in memory.

If the AT determines that the RANHandoff indicator is set to indicate that the new network supports the Location Update Protocol, then at step 204, the AT
transmits an ULNM to the network. The network, not the AT, then determines whether to force a PPP session resynchronization.

However, if the AT determines that the RANHandoff indicator is set to indicate that the new network does not support the Location Update Protocol, then at step 206, the AT itself forces a PPP session resynchronization. In one aspect of the embodiment, the AT forces a PPP session resynchronization by transmitting a Link Control Protocol Configuration Request message (LCPConfigRequest) to the new network. The receipt of an LCPConfigRequest will force the network to conduct a resynchronization of the PPP session.

Once the cdma2000 1xEV-DO session is opened, the session remains open for a lengthy period of time, even if the AT exits the range of the network. Hence, the RANHandoff indicator should be stored in memory in case the AT exits the range of the network and then re-enters the range of the network. The program flow may be altered without undue experimentation to accommodate a stored RANHandoff indicator rather than a recently received RANHandoff indicator. For example, the program flow may be altered by substituting step 202 with a call to memory to determine the value of a stored RANHandoff indicator.

In the second embodiment, the AT uses the "PPP Magic Number" to determine whether to force a resynchronization of the PPP session. The PPP Magic Numbers are identifiers for the parties of a PPP session. Such identifiers are randomly generated and are used to identify loop backs and other Data Link Layer anomalies. A more detailed description of Magic Numbers is found in aforementioned RFC 1661.

Figure 3:
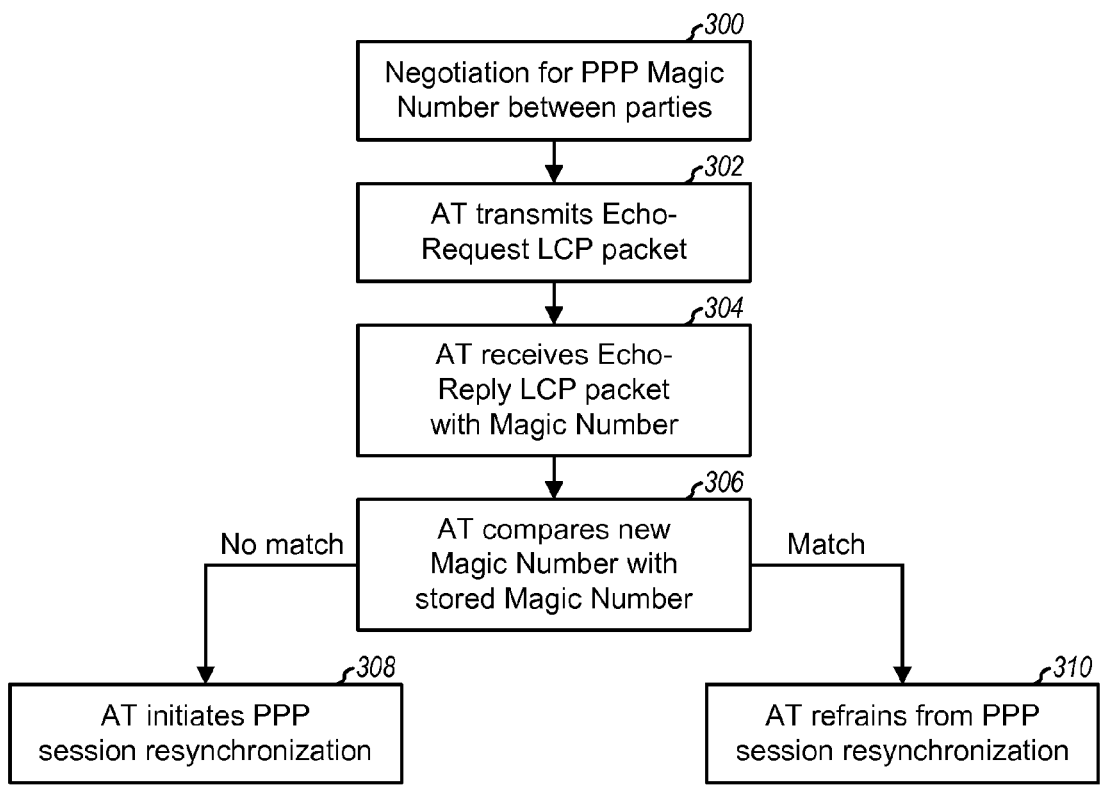
FIG. 3 is a flowchart illustrating another embodiment for forcing resynchronization of a PPP session.

FIG. 3 is a flowchart illustrating the method steps of the second embodiment. The method may be implemented in hardware using at least one processing element which executes instructions for the method, wherein said instructions are stored on at least one memory element.

In the second embodiment, the AT determines at the Data Link Layer whether a recently received Magic Number matches one stored in memory. If the recently received Magic Number does not match, then the AT may determine that the current PPP session needs resynchronization. At step 300 of FIG. 3, the AT negotiates the PPP Magic Number of the PDSN and stores the number into memory. At step 302, the AT transmits an Echo-Request Link Control Protocol (LCP) packet upon determination of a new coverage area. The new coverage area may be a new air-interface network or a new subnet area. Note that subnet areas are defined by the control of different PCFs (see FIG. 1). At step 304, the AT receives an Echo-Reply packet containing a newly received Magic Number. At step 306, the AT compares the stored Magic Number with the newly received Magic Number. If the Magic Numbers do not match, then at step 308, the AT initiates the resynchronization of the PPP session. If the Magic Numbers do match, then at step 310, the AT refrains from resynchronizing the PPP session since no resynchronization is required.

The embodiments described above have been described in the context of movement between cdma2000 1xRTT networks and cdma2000 1xEV-DO networks, but it should be understood that the embodiments may also be used in the context of movement between WCDMA networks and cdma2000 1xEV-DO networks. For example, the PPP Magic Number embodiment involves the use of data link layer information, which is an attribute of the IP packets, not of the air-interfaces. Hence, the data link layer information is available for use by an AT that is moving from the coverage of a WCDMA system to a cdma2000 1xEV-DO system in order to force a PPP session resynchronization.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for resynchronizing a Point-to-Point Protocol (PPP) session that has been initiated between a first network and an access terminal (AT) and subsequently continued between a second network and the AT, the method comprising:
   determining whether an indicator of the second network is set to indicate support of a Location Update Protocol;
   if the indicator indicates support of the Location Update Protocol, then transmitting an unsolicited location notification message (ULNM) from the AT to the second network; and
   if the indicator indicates a lack of support for the Location Update Protocol, then transmitting a Link Control Protocol Configuration Request message (LCPConfigRequest) to the second network.

2. The method of claim 1, wherein the second network is a cdma2000 1xEV-DO network.

3. The method of claim 1, wherein the indicator is a RANHandoff indicator.

4. Apparatus for resynchronizing a Point-to-Point Protocol (PPP) session that has been initiated between a first network and an access terminal (AT) and subsequently continued between a second network and the AT, the method comprising:
   means for determining whether an indicator of the second network is set to indicate support of a Location Update Protocol;
   means for transmitting an unsolicited location notification message (ULNM) from the AT to the second network if the indicator indicates support of the Location Update Protocol; and
   means for transmitting a Link Control Protocol Configuration Request message (LCPConfigRequest) to the second network if the indicator indicates a lack of support for the Location Update Protocol.

5. Apparatus for resynchronizing a Point-to-Point Protocol (PPP) session that has been initiated between a first network and an access terminal (AT) and subsequently continued between a second network and the AT, the apparatus comprising:
   at least one memory element; and
   at least one processing element configured to execute a set of instructions stored in said at least one memory element, the set of instructions for:
      determining whether an indicator of the second network is set to indicate support of a Location Update Protocol;
      transmitting an unsolicited location notification message (ULNM) from the AT to the second network if the indicator indicates support of the Location Update Protocol; and
      transmitting a Link Control Protocol Configuration Request message (LCPConfigRequest) to the second network if the indicator indicates a lack of support for the Location Update Protocol.

6. A method for resynchronizing a Point-to-Point Protocol (PPP) session that has been initiated between a first network and an access terminal (AT), the method comprising:
   determining whether the AT has entered coverage area of a second network;
   transmitting a Link Control Protocol (LCP) packet to the second network from the AT if the AT is determined to have entered the coverage area of the second network;

receiving a second LCP packet from the second network at the AT;

comparing a value in the second LCP packet with a stored value; and if the value in the second LCP packet is not the same as the stored value, then resynchronizing the PPP session.

7. The method of claim 6, wherein the value in the second LCP packet is a PPP Magic Number value and the stored value is a stored PPP Magic Number.

8. Apparatus in an Access Terminal (AT) for determining whether to initiate resynchronization of a Point-to-Point Protocol (PPP) session that originated between a first network and the AT, the apparatus comprising:

at least one memory element; and at least one processing element configured to execute a set of instructions stored within the at least one memory element, the set of instructions for:

determining whether the AT has entered coverage area of a second network;

transmitting a Link Control Protocol (LCP) packet to the second network if the AT is determined to have entered the coverage area of the second network;

receiving a second LCP packet from the second network;

comparing a magic number in the second LCP packet with a stored magic number; and if the magic number in the second LCP packet is not the same as the stored magic number, then initiating resynchronization of the PPP session.

9. The method of claim 1, further comprising:

performing PPP session resynchronization if directed by the second network in response to the ULNM.

10. The method of claim 1, further comprising:

initiating PPP session resynchronization by transmitting the LCPConfigRequest to the second network.

11. The apparatus of claim 4, further comprising:

means for performing PPP session resynchronization if directed by the second network in response to the ULNM.

12. The apparatus of claim 4, further comprising:

means for initiating PPP session resynchronization by transmitting the LCPConfigRequest to the second network.

13. The apparatus of claim 5, wherein the at least one processing element is further configured to execute the set of instructions for:

performing PPP session resynchronization if directed by the second network in response to the ULNM.

14. The apparatus of claim 5, wherein the at least one processing element is further configured to execute the set of instructions for:

initiating PPP session resynchronization by transmitting the LCPConfigRequest to the second network.

15. The method of claim 6, frirther comprising:

if the value in the second LCP packet is the same as the stored value, then refraining from resynchronizing the PPP session.

16. The apparatus of claim 8, wherein the at least one processing element is further configured to execute the set of instructions for:

if the value in the second LCP packet is the same as the stored value, then refraining from resynchronizing the PPP session.

* * * * *